United States Patent

Mullaly

[15] 3,675,045

[45] July 4, 1972

[54] VOLTAGE RESPONSIVE SWITCH

[72] Inventor: Jerome R. Mullaly, Liverpool, N.Y.

[73] Assignee: General Electric Company

[22] Filed: Feb. 4, 1971

[21] Appl. No.: 112,685

[52] U.S. Cl. ..............................307/235, 307/289, 330/30 D

[51] Int. Cl. ..........................................H03k 5/20, H03k 3/26

[58] Field of Search ........................307/235, 290; 330/30 D; 307/289

[56] References Cited

UNITED STATES PATENTS 3,569,739 3/1971 Stolman..................................307/235

3,416,004 12/1968 Taylor..................................307/290 X

*Primary Examiner*—John Zazworsky

*Attorney*—Robert J. Mooney, Nathan J. Cornfeld, Frank L. Neuhauser, Oscar B. Waddell, Joseph B. Forman and Carl O. Thomas

[57] ABSTRACT

A voltage amplitude-responsive monolithic semiconductor integrated bi-stable switch is described, which switches responsive to level of input voltage relative to an internally generated reference potential, and is operable over a wide range of supply voltages and ambient temperatures with high gain regenerative switching action and predetermined hysteresis.

5 Claims, 2 Drawing Figures

INVENTOR:
JEROME R. MULLALY,
BY Robert J. Mooney
HIS ATTORNEY.

VOLTAGE RESPONSIVE SWITCH

The present invention relates to improvements in semiconductor integrated circuits, and more particularly to an improved voltage amplitude-responsive switch of the monolithic integrated circuit type.

It is known in the prior art to provide bi-stable circuits whose state depends on the amplitude of the input voltage and which switch from one state to the other by means of regenerative coupling between successive stages. Such circuits are useful, for example, for wave form restoration, squaring of sinusoidal or non-rectangular wave inputs, and detection or switching responsive to input voltage level or amplitude. Prior art circuits of this type, sometimes referred to as "Schmitt trigger" circuits, have been susceptible to undesirable instabilities under adverse conditions such as variation in ambient temperature and supply voltage, and hence have not been capable of reliable precision operation under such adverse conditions.

Accordingly, one object of the present invention is to provide an improved semiconductor integrated voltage amplitude responsive switch which provides reliable precision bi-stable operation responsive to predetermined input signal voltage levels, despite wide variations in temperature and supply voltage.

Another object is to provide a circuit of the foregoing character and of monolithic semiconductor integrated form which has a desirably high input impedance, which is capable of providing an output of non-inverted polarity, which has desirably low output saturation voltage, and which has a predeterminable amount of hysteresis. As used herein, the term "hysteresis" refers to the difference between the input voltage which causes the circuit to switch from its first stable state to its second stable state, and the input voltage at which the circuit switches back to its first stable state.

These and other objects of the present invention will become more readily apparent from the following detailed description and the accompanying drawing wherein.

Figure 1:
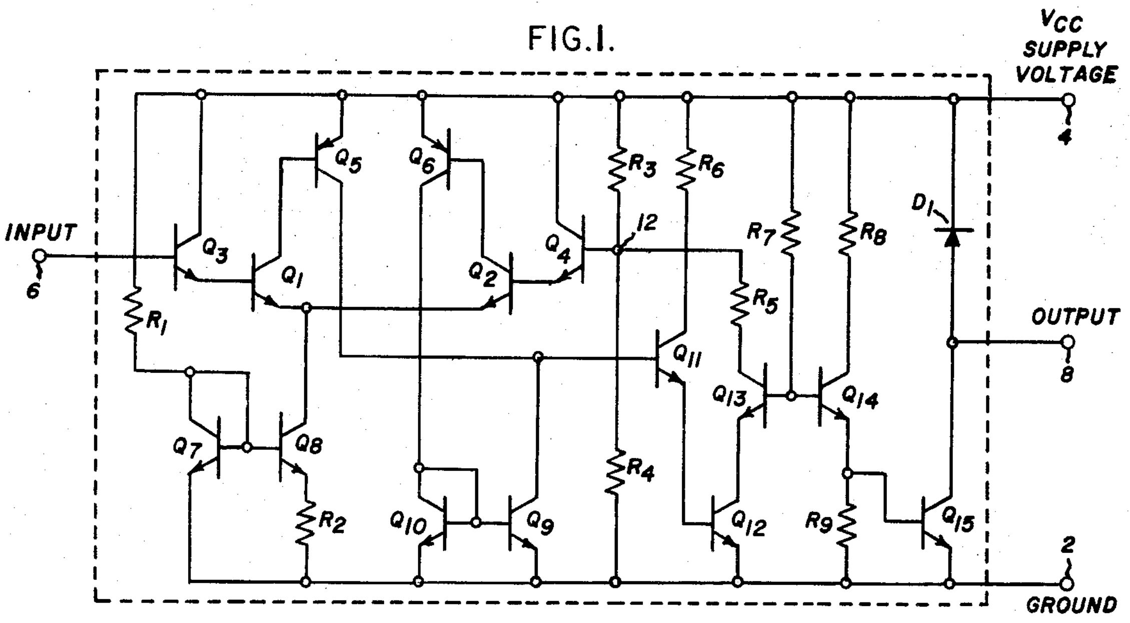
FIG. 1 is a circuit diagram of a voltage amplitude-responsive monolithic integrated switch circuit according to the present invention.

Referring to FIG. 1 of the drawing, it will be evident that from a schematic standpoint the circuit includes no capacitors (other than parasitic), but consists entirely of transistors and resistors, plus output diode D1. Hence, it will be recognized that the circuit is particularly suitable for monolithic integrated semiconductor embodiment manufactured, for example, by the so-called planar processing techniques well known to those skilled in the art and not requiring further exposition here.

The circuit of FIG. 1 includes a ground terminal 2, a terminal 4 to be connected to a source of supply voltage, an input terminal 6 for connection to the input signal voltage whose amplitude the circuit is intended to sense and respond to, and an output terminal 8. Basically, the circuit operates as follows. When the input voltage amplitude exceeds a predetermined reference potential level, output transistor Q15 is turned from "on" to "off," and thus the circuit is switched from a first stable state to a second stable state. This provides a high impedance path between output terminal 8 and ground terminal 2. This extinguishes output current flow, for example, through a load (not shown) connected between supply voltage terminal 4 and output terminal 8, and causes the potential at output terminal 8 to rise toward Vcc. When the amplitude of the input voltage at terminal 6 subsequently falls below another predetermined potential level, transistor Q15 is again turned on, and the circuit switches back to its first bi-stable state.

Turning now to details of the circuit of FIG. 1, the voltage amplitude-responsive switch of the present invention can, for ease of understanding, be thought of as having four basic stages, namely, a voltage comparison or differential amplifier section, a reference-voltage section, a hysteresis-determining section, and an output section. All of these sections, and their mode of operation and cooperative interaction, are fully described hereinafter.

The voltage comparison section of the circuit includes a pair of matched PNP transistors Q5 and Q6, the emitters of which are connected directly to the supply voltage. The base of Q5 is driven by the input signal at terminal 6 through cascaded input amplifying transistors Q3 and Q1. The base of Q6 is driven through cascaded transistors Q4 and Q2, matched to transistors Q3 and Q1, the base potential of Q4 being supplied by a direct connection to a reference potential point 12.

The reference voltage section determines the potential of reference potential point 12. Point 12 is the common point of voltage divider resistors R3 and R4, connected in series between the supply voltage and ground. Also included in the reference voltage section is resistor R5, which is connected between point 12 and the collector of transistor Q13 in the hysteresis section, further described hereinafter.

Describing the remainder of the voltage comparison section, transistors Q1 and Q2 in the voltage comparison section have a common current path for their emitters, through transistor Q8 and its emitter resistor R2 to ground. Transistors Q1 through Q6 provide a darlington differential amplifier the sense of whose output responds to a difference in potential between input terminal 6 and the potential of point 12 and determines whether the collector current of transistor Q6 exceeds that of Q5 or vice versa, and whose comparative collector currents control the remaining sections of the overall circuit.

To enhance the stability and precision of operation of the voltage comparison section, even in the presence of large fluctuations in temperature and supply voltage, transistors Q8 and Q7 provide a variable impedance current sink, and consequent current regulation, so as to minimize variations in the emitter current of Q1 and Q2. The bases of Q7 and Q8 are directly connected, and are connected to the collector of Q7 and through collector resistor R1 to the supply voltage. The emitter of Q7 is connected directly to ground, and the emitter of Q8 is grounded through resistor R2. In current regulating operation, the voltage divider action of resistor R1 and the impedance constituted by transistor Q7 stabilizes the collector current of transistor Q8 by establishing a reference potential at the base of Q8. For example, as current through R2 tends to increase, the base-emitter voltage of Q8 tends to correspondingly decrease, which tends to reduce the collector current of Q8 to a level such that the base-emitter voltage of Q8 plus the potential drop across R2 equals the base-emitter voltage of Q7. Conversely, as current through R2 tends to decrease, the base-emitter voltage of Q8 tends to increase, increasing the current through Q8 to maintain the previously defined equality with the base-emitter voltage of Q7. R2 further serves to limit the current through Q8 to a small fraction of that through Q7, thereby minimizing the input current at terminal 6 to which the circuit is responsive, and in effect providing a desirably high input impedance for the circuit.

Other important features of the voltage comparison section are provided by transistor Q10, which is connected in the collector circuit of Q6, and Q9 which is connected in the collector circuit of Q5. The emitters of Q9 and Q10 are grounded, and the bases of Q9 and Q10 are tied together and to the collector of Q10. So connected, transistors Q9 and Q10 cooperate to insure that even a slightly greater collector current in Q6 than in Q5 causes Q9 to turn on to saturation. But when the collector currents of Q5 and Q6 become equal, Q9 comes out of saturation and its collector potential rises steeply toward Vcc.

Thus, in the switching of the circuit between its two stable states, Q9 and Q10 provide an active load for Q5 and Q6 which produces a pronounced and steep voltage swing at the base of transistor Q11 responsive to a very slight unbalance in the base drives to Q5 and Q6. The net effect is to provide, when the base drives at Q5 and Q6 are balanced, a stage of very high voltage gain at the base of Q11, without requiring high value resistors; yet prior to balance of the base drives of Q5 and Q6, the voltage gain of this stage at the base of Q11 is essentially zero and thereby affords the circuit enhanced stability in each of its respective stable states.

The hysteresis section includes transistors Q11, Q12 and Q13, and resistors R5 and R6. As has been described, when transistor Q5 begins to turn on due to the input voltage exceeding the threshold determined by the potential of reference point 12, the base potential of Q11 rises abruptly toward Vcc, and Q11 turns on, turning on Q12 and Q13. R7 is a bias resistor for Q13 and Q14. The turning on of Q13 effectively connects R5 in its collector circuit between reference point 12 and ground, and thereby reduces the reference potential at point 12 by placing R5 in parallel with R4 in the voltage divider determining the potential of point 12. This lowering of the reference voltage at point 12 produces regeneration which turns Q5 further on. Then as Q12 saturates, pulling the bases of Q13 and Q14 to only one $V_{BE}$ diode drop above ground, Q14 and Q15 in the output stage are switched from on to off.

This introduction of R5 in the voltage divider determines the hysteresis of the circuit, since the input potential at terminal 6 must now drop below the new lowered potential of reference potential point 12 before the circuit will switch back to its first stable state.

In the output section, transistors Q14 and Q15 constitute a high gain split-darlington cascade arrangement, for enhanced responsiveness to the drive at the base of Q13. R9 is a leakage and turn-off resistor across the base-emitter junction of Q15. Diode D1 is a clamping diode provided in the collector circuit of transistor Q15, between the supply voltage and output terminals, to limit voltage overshoot at output terminal 8 with inductive loads connected between the output terminal 8 and supply voltage terminal 4.

In the operation of the circuit, as previously explained, Q15 is on in a first stable state of the circuit when the potential at input terminal 6 is less than that of reference potential point 12 and transistor Q6 is turned on. As input potential equals and exceeds that of point 12, Q5 turns on, turning off Q9 and turning on Q11, Q12 and Q13, and the resulting regenerative effect lowers the potential at point 12 by the hysteresis predetermined by the value of R5 and turns Q14 and Q15 off. This switches the circuit to its second stable state. Switching in the opposite direction involves the turning off of Q11 and Q12 responsive to turn on of Q9 as Q6 begins to turn on when the input voltage at terminal 6 falls below the reduced value of reference potential at point 12. As Q12 comes out of saturation, Q13 remains in saturation, but the collector current of Q13 decreases as collector voltage of Q12 rises. This raises the voltage at point 12 as R5 begins to drop out of the voltage divider, producing a regenerative effect which hastens the turn off of Q5 and turn on of Q6, with resulting sharp turn on of Q15 and restoration of the circuit to its first stable state.

In one exemplary operative commercial embodiment of the circuit hereinabove described, the supply voltage could vary from 2.3 to 9.0 volts D.C., the minimum input current was 50 nanoamperes, the tolerable ambient temperature variation was from −40° C to +100° C, and controlled switching occurred at input voltage levels of 0.6 Vcc and 0.54 Vcc respectively. In this embodiment, the output saturation voltage at up to 250 m.a. D.C. was no more than 0.5 volts D.C., and the resistors R1 through R9 had the following approximate values:

| | |
|---|---|
| R1 | 10K ohms |
| R2 | 5K ohms |
| R3 | 4K ohms |
| R4 | 6K ohms |
| R5 | 17.4K ohms |
| R6 | 5.6K ohms |
| R7 | 3.9K ohms |
| R8 | 320 ohms |
| R9 | 50K ohms |

Figure 2:
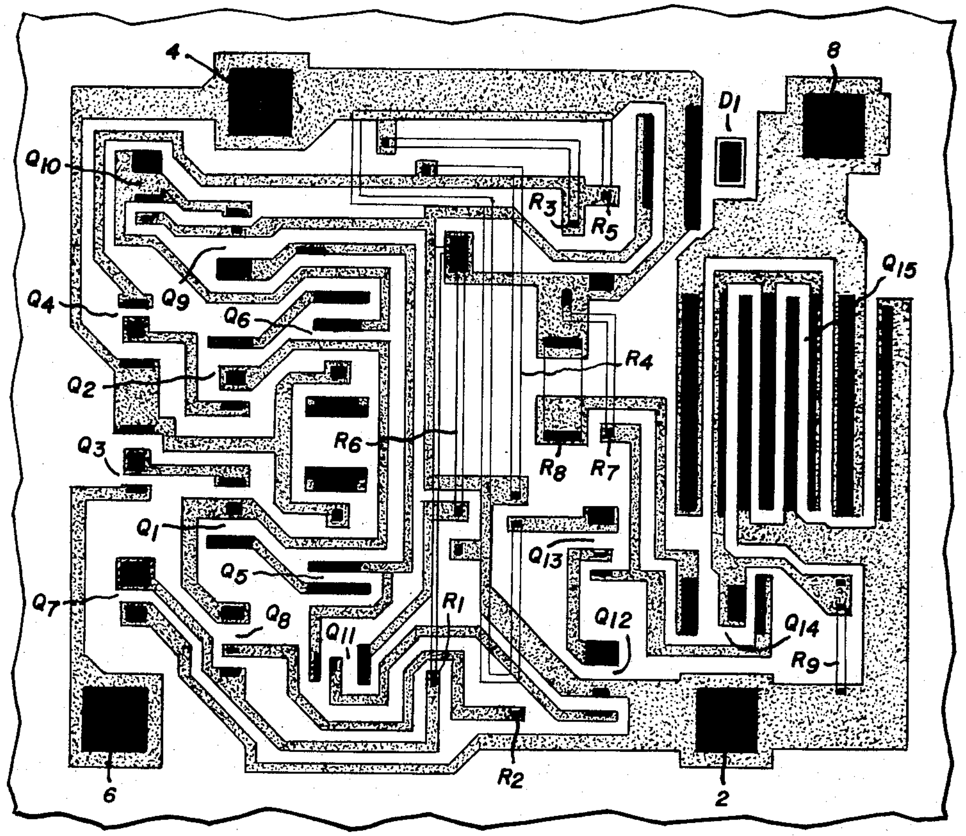
FIG. 2 is a plan view of a monolithic integrated embodiment of the circuit shown in FIG. 1.

The circuit was laid out as shown in FIG. 2, with the output transistor Q15 centrally located for good heat dispersion, and matched pairs of transistors close together. The P-type substrate silicon used for the circuit had a resistivity of 2 ohm-cms. and the N-type epitaxial layer provided on the substrate had a resistivity of 3 ohm-cms. Oxide masking and diffusion was employed in forming the resistors, transistors, and diode D1, and the transistor base junction depth was about 12 "-fringes," i.e. approximately 0.15 mil.

Thus there has been shown and described an improved monolithic voltage amplitude-responsive semiconductor integrated circuit which is capable of tolerating wide variations in supply voltage and temperature, yet switches precisely from one bi-stable state to another responsive to input voltage amplitude exceeding predetermined threshold, and which switches back to its first bi-stable state precisely responsive to input voltage falling below a second predetermined threshold. The circuit provides an output of non-inverted polarity, and has low output saturation voltage yet high input impedance requiring little input current.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claims.

What I claim as new and desire to secure by Letters Patent of the United States is:

1. In a monolithic semiconductor integrated circuit switchable from one of two stable states to the other responsive to input voltage amplitude, a supply voltage terminal and a ground terminal between which is adapted to be connecting a supply voltage source, reference voltage means for providing a reference voltage related to the supply voltage, an input terminal between which and said ground terminal an input voltage is adapted to be connected, voltage comparator means connected between the input terminal and the reference voltage means and having a differential output of one sense when the input voltage exceeds the reference voltage and of the opposite sense when the reference voltage exceeds the input voltage, an output terminal, output transistor means connected between said output terminal and said ground terminal and switchable between a first stable state providing a low impedance path and a second stable state providing a high impedance path responsive to the sense of the output of said voltage comparator means, and switch control means connecting the output transistor means to the output of the voltage comparator means, said switch control means including hysteresis means for regeneratively changing the voltage of said reference voltage means responsive to a change in the sense of the output of said voltage comparator means.

2. The circuit of claim 1 wherein the voltage comparator means includes a pair of matched differential amplifier transistors having a common load current path, and current regulating means is provided in said path to minimize variations of load current therein with changes in supply voltage and temperature.

3. The circuit of claim 1 wherein the switch control means includes means for amplifying the differential output of said voltage comparator means, said amplifying means having a high gain when the inputs to said voltage comparator are balanced, and a low gain when the inputs to said voltage comparator means are unbalanced.

4. The circuit of claim 1 wherein clamping means connects the output terminal to the supply voltage terminal to prevent the output terminal voltage from substantially exceeding the voltage at the supply voltage terminal.

5. In a monolithic semiconductor integrated circuit responsive to input voltage amplitude to switch from one of two stable states to the other, a supply voltage terminal and a ground terminal between which is adapted to be connecting a supply voltage source, reference voltage means including a voltage divider for providing a reference voltage having a predetermined relation to the voltage at the supply voltage terminal, an input terminal between which and said ground terminal is adapted to be connecting an input voltage to whose amplitude the circuit is responsive.

voltage comparator means including a differential transistor amplifier connected between the input terminal and the reference voltage means and having a differential collector current output of one differential sense when the input voltage exceeds the reference voltage and of the opposite sense when the reference voltage exceeds the input voltage, an output terminal, output transistor means connected between said output terminal and said ground terminal and switchable between a first stable state providing a low impedance path between said output and ground terminals and a second stable state providing a high impedance path between said output and ground terminals, and switch control means connected between the output transistor means and the voltage comparator means and responsive to the sense of the collector current output of said differential transistor amplifier to drive said output transistor means from one stable state to the other stable state as said sense changes, said switch control means including hysteresis means for regeneratively lowering the voltage of said reference voltage means responsive to the input voltage exceeding said reference voltage and for regeneratively raising the reference voltage responsive to the reference voltage exceeding the input voltage.

* * * * *